(12) United States Patent
Ueda et al.

(10) Patent No.: US 8,068,388 B2
(45) Date of Patent: Nov. 29, 2011

(54) OPTICAL PICK UP AND OPTICAL DISC DEVICE HAVING OPTICAL SHIELD FOR SUPPRESSING THE INFLUENCE OF STRAY LIGHT THROUGH HOLOGRAM ELEMENT

(75) Inventors: Yasuo Ueda, Osaka (JP); Yasumasa Shibata, Osaka (JP); Hiroshi Tajika, Nara (JP); Kosuke Takahashi, Osaka (JP); Hiroaki Takahashi, Osaka (JP)

(73) Assignee: Panasonic Corporation, Osaka (JP)

( * ) Notice: Subject to any disclaimer, the term of this patent is extended or adjusted under 35 U.S.C. 154(b) by 1259 days.

(21) Appl. No.: 11/574,061

(22) PCT Filed: Mar. 7, 2006

(86) PCT No.: PCT/JP2006/304355
§ 371 (c)(1),
(2), (4) Date: Feb. 22, 2007

(87) PCT Pub. No.: WO2006/095725
PCT Pub. Date: Sep. 14, 2006

(65) Prior Publication Data
US 2009/0147656 A1    Jun. 11, 2009

(30) Foreign Application Priority Data
Mar. 8, 2005  (JP) ................................. 2005-063293

(51) Int. Cl.
*G11B 7/00* (2006.01)
(52) U.S. Cl. ................. 369/44.24; 369/112.03
(58) Field of Classification Search .... 369/44.23–44.24, 369/44.37–44.38, 44.41–44.42, 112.01, 112.03, 369/112.05–112.06, 112.1–112.11, 112.15, 369/112.22, 116–118, 121
See application file for complete search history.

(56) References Cited

U.S. PATENT DOCUMENTS
2002/0024916 A1* 2/2002 Ueyama et al. .......... 369/112.04
(Continued)

FOREIGN PATENT DOCUMENTS
EP    1 231 603    8/2002
(Continued)

OTHER PUBLICATIONS
Machine-Assisted Translation of JP 2001-110085.*
(Continued)

*Primary Examiner* — Nathan Danielsen
(74) *Attorney, Agent, or Firm* — Renner, Otto, Boisselle & Sklar, LLP

(57) ABSTRACT

An optical pickup according to the present invention includes: a light source $1d$ for irradiating an optical disk 4 with light; a lens 3 for converging the light onto the optical disk 4; a photodetector $1c$ having a plurality of detection regions $1cf$, $1ct$ for detecting light which is reflected from a signal surface of the optical disk 4 and converting the light into an electrical signal; a hologram element $1a$ having a hologram region $1b$ for guiding the reflected light to the photodetector $1c$; and a light-shielding plate 2 for blocking at least a portion of light transmitted through a region of the hologram element $1a$ other than the hologram region $1b$. The light-shielding plate 2 includes a light shielding portion $2b$ for blocking light, and an aperture $2a$ for allowing the light to be transmitted therethrough. The aperture $2b$ is present, above an upper face of the hologram element $1a$, in a region including the hologram region $1b$, and a center position of the aperture $2b$ is shifted from a center position of the hologram region $1b$.

11 Claims, 8 Drawing Sheets

U.S. PATENT DOCUMENTS

| | | | |
|---|---|---|---|
| 2002/0044589 A1 | 4/2002 | Terashima et al. | |
| 2004/0027939 A1* | 2/2004 | Okada | 369/44.37 |
| 2006/0226432 A1 | 10/2006 | Nemoto | |
| 2008/0025185 A1* | 1/2008 | Someno et al. | 369/103 |

FOREIGN PATENT DOCUMENTS

| | | |
|---|---|---|
| JP | 11-025496 | 1/1999 |
| JP | 2000-251308 | 9/2000 |
| JP | 2001-110085 | 4/2001 |
| JP | 2002-124727 | 4/2002 |
| JP | 2004-220675 | 8/2004 |
| WO | 01/35400 | 5/2001 |

OTHER PUBLICATIONS

Machine-Assisted Translation of JP 2004-220675.*
International Search Report for corresponding Application No. PCT/JP2006/304355 mailed Apr. 11, 2006.

* cited by examiner

Fig.4
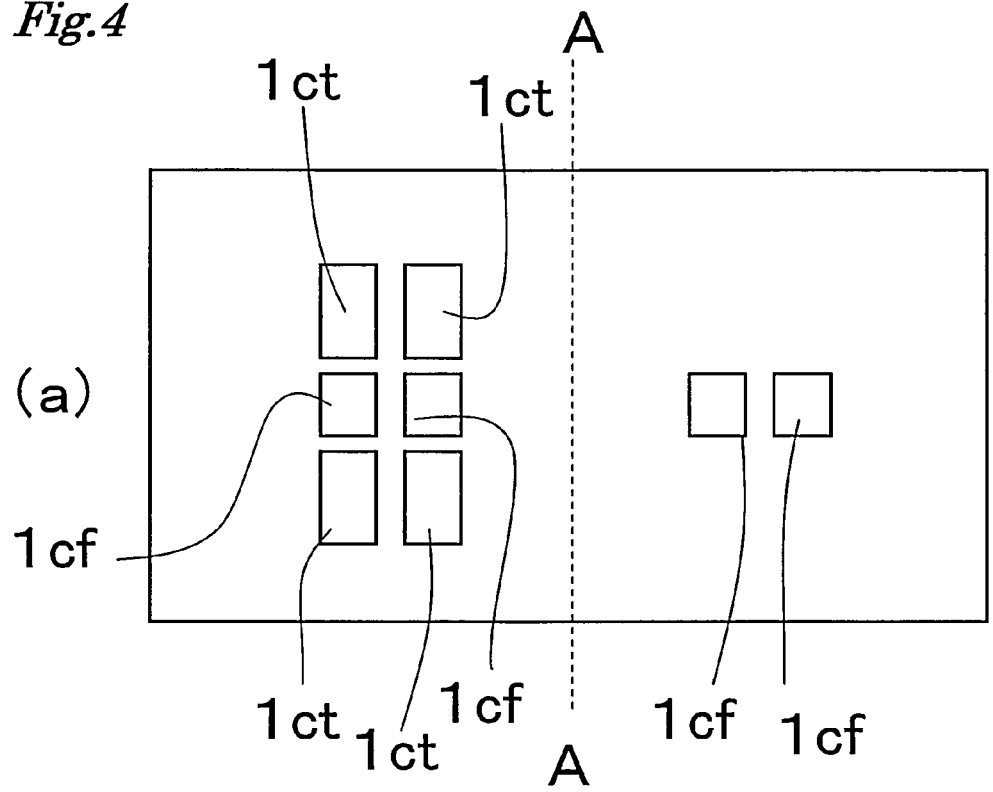
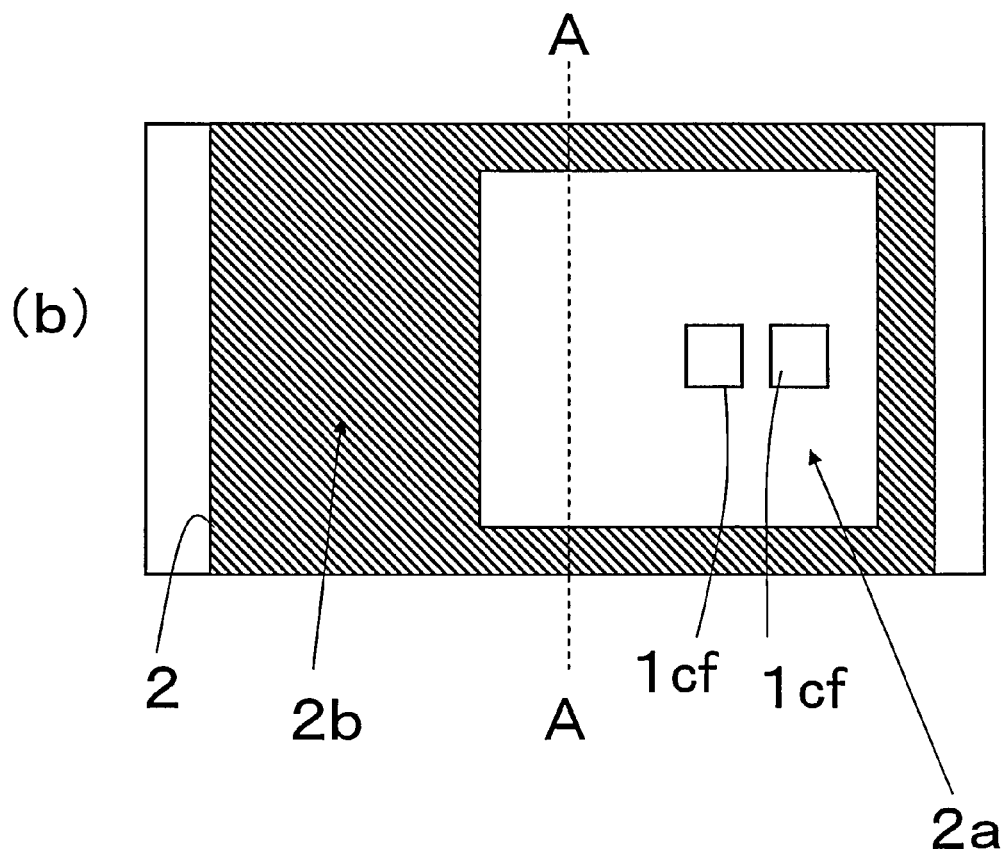

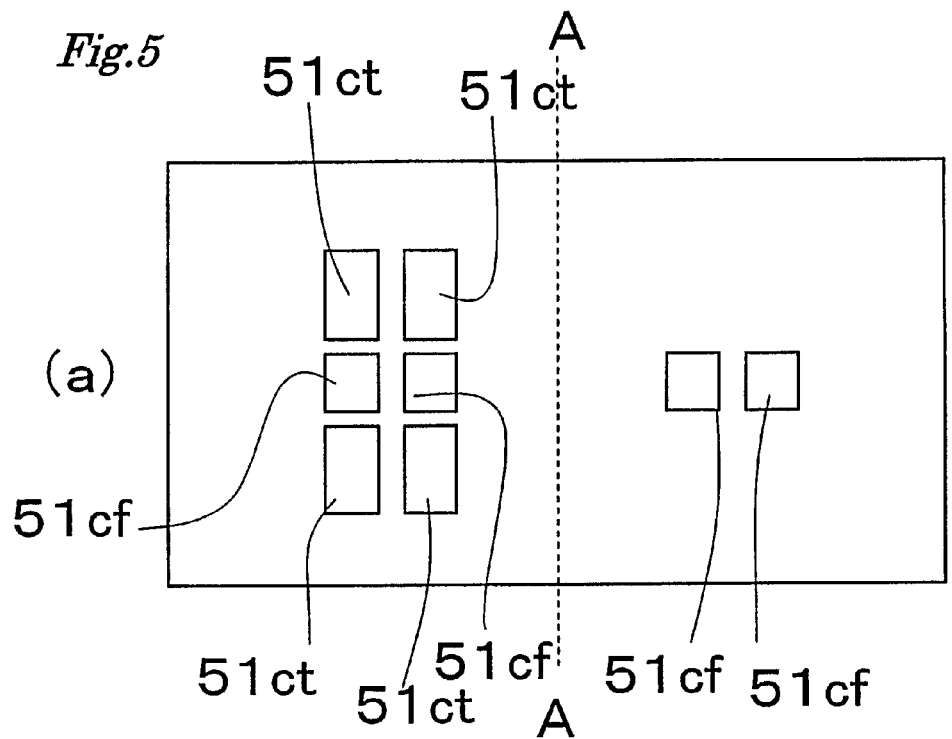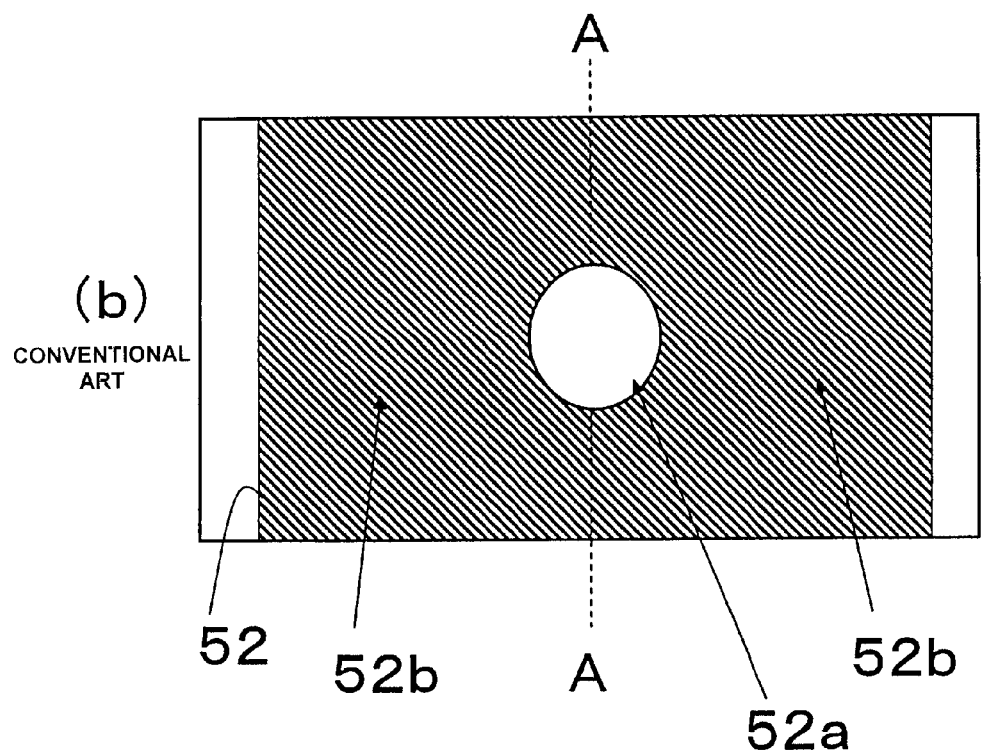

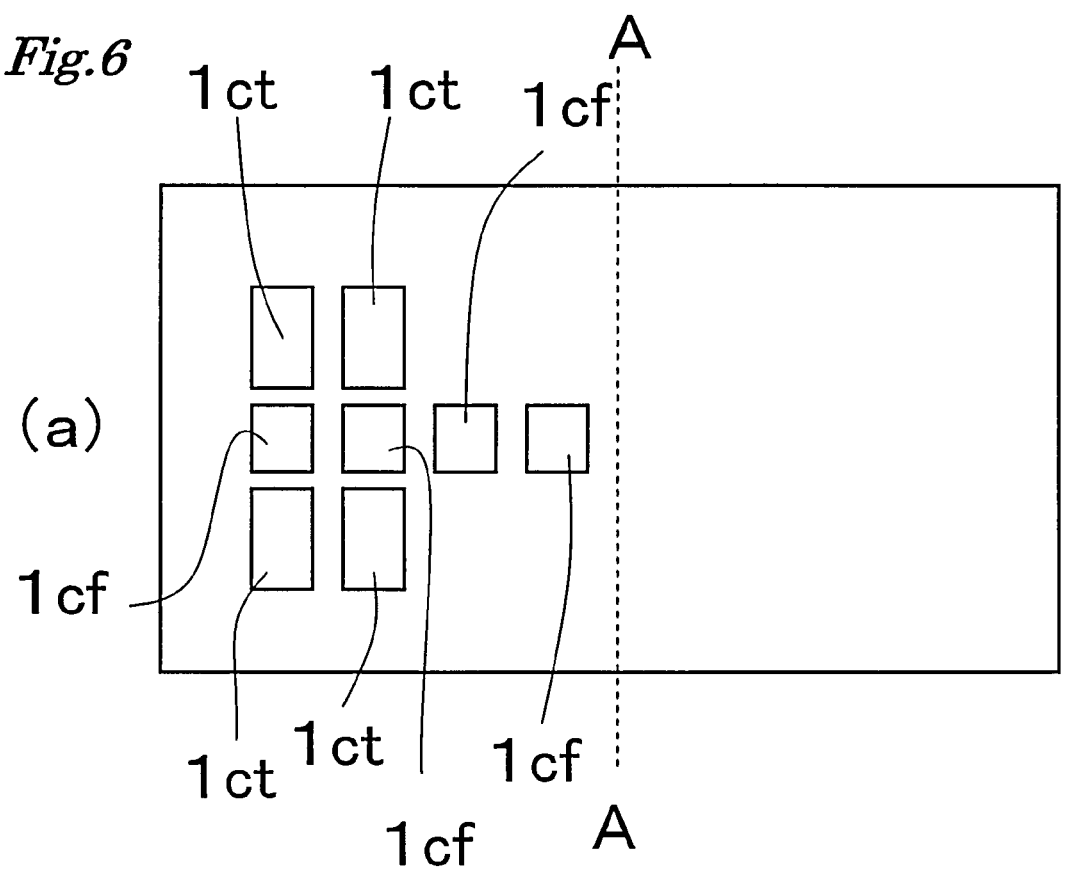
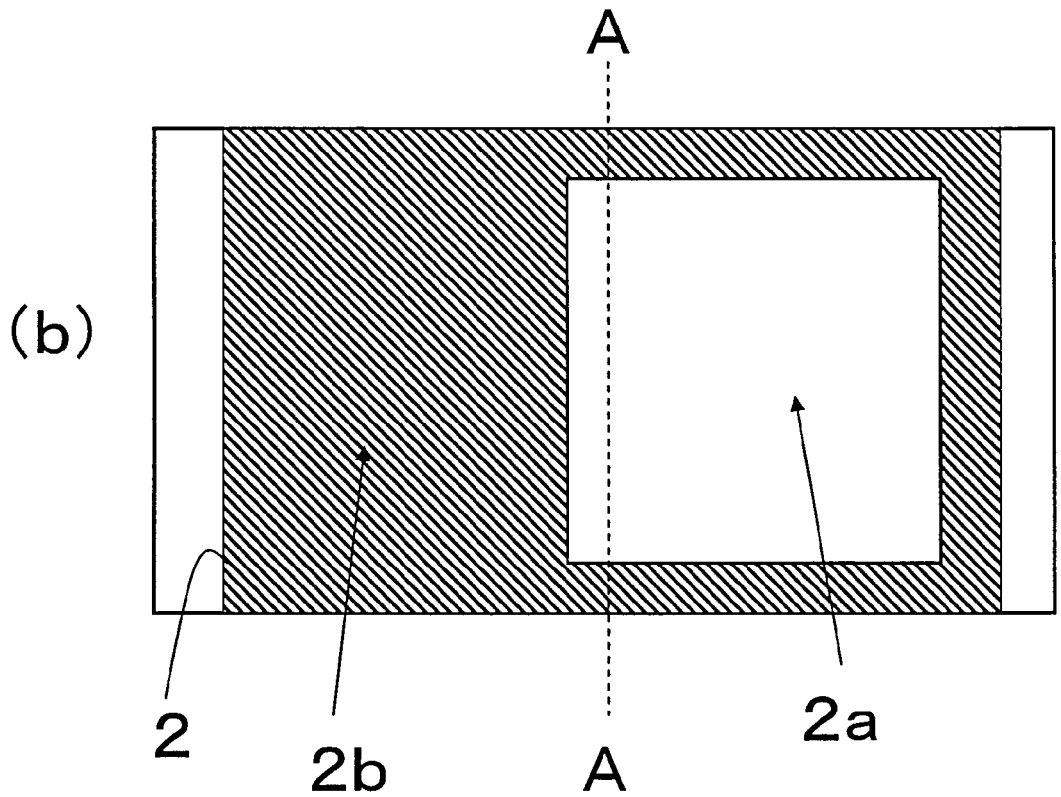
Fig.6

OPTICAL PICK UP AND OPTICAL DISC DEVICE HAVING OPTICAL SHIELD FOR SUPPRESSING THE INFLUENCE OF STRAY LIGHT THROUGH HOLOGRAM ELEMENT

TECHNICAL FIELD

The present invention relates to an optical pickup and an optical disk apparatus incorporating the pickup.

BACKGROUND ART

In a recording/reproduction apparatus for optical disks, in order to read data from an optical disk or write data to an optical disk, it is necessary to access a desired position on the optical disk by using an optical pickup. An optical pickup includes a light source for emitting a light beam, an objective lens for converging the light beam onto an optical disk, and a photodetector for outputting electrical signals based on the light beam having been reflected from the optical disk.

A semiconductor laser is used as a light source in an optical pickup. A semiconductor laser operates with a driving current which is supplied form a laser driving circuit, and is capable of emitting laser light of an intensity which is in accordance with the driving current.

Data which is recorded on an optical disk is reproduced by irradiating the rotating optical disk with a light beam having a relatively weak constant light amount, and detecting reflected light which has been modulated by the optical disk.

On a read-only optical disk, information in the form of pits is recorded in a spiral manner, previously during manufacture of the optical disk. On the other hand, in the case of a rewritable optical disk, a method such as vapor deposition is used to deposit a film of recording material which allows for optical data recording/reproduction, on the surface of a base material on which a track having spiral land or groove is formed. In the case where data is to be recorded on a rewritable optical disk, the optical disk is irradiated with a light beam whose light amount is modulated in accordance with the data to be recorded, thus causing local changes in the characteristics of the recording material film, whereby a data write is effected.

Note that the depth of the pits, the depth of the track, and the thickness of the recording material film are small relative to the thickness of the base material of the optical disk. Therefore, any portion of the optical disk where data is recorded constitutes a two-dimensional surface, and may be referred to as a "signal surface" or an "information surface". Although such a signal surface (information surface) may sometimes need to be referred to as an "information layer" because of having a physical size along the depth direction, for simplicity, it will be referred to as a "signal surface (information surface)" in the present specification. An optical disk includes at least one such signal surface. Note that one signal surface may actually include a plurality of layers, e.g., a phase-change material layer and a reflective layer.

When reproducing data which is recorded on an optical disk, or recording data onto a recordable optical disk, it is necessary for a light beam to always retain a predetermined convergence state on a target track on the signal surface. This requires "focus control" and "tracking control". "Focus control" refers to controlling the position of an objective lens along a normal direction of the signal surface (hereinafter may be referred to as the "depth direction of the substrate") so that a focal point of the light beam (convergence point) is always positioned on the information layer. On the other hand, tracking control refers to controlling the position of an objective lens along a radial direction of the optical disk (hereinafter referred to as the "disk radial direction") so that a spot of the light beam is positioned on a predetermined track.

In order to perform focus control and tracking control, it is necessary to generate a focus error signal and a tracking error signal based on light which is reflected from the signal surface of an optical disk. Such signals are generated based on electrical signals which are output from a photodetector which is provided within an optical pickup.

Out of the light which is reflected from the optical disk (hereinafter referred to as "reflected light"), unnecessary light, which is other than the portion which is necessary for generating various signals, may enter the photodetector. If scratches or dust is present on the surface of the optical disk, light may be scattered or reflected in unexpected directions when the convergence point of the light beam which is emitted from the optical pickup crosses the scratches or dust. When the unnecessary light which is thus generated enters the photodetector as stray light which does not follow a predetermined path, the output signal from the photodetector may have a noise component.

Patent Document 1 and Patent Document 2 disclose optical pickups which have an optical shield for blocking such stray light.

FIG. 7 is an essential structural diagram showing a conventional optical pickup which is described in Patent Document 1.

The illustrated optical pickup includes an integrated light receiving/emitting element 101, an objective lens 103 for converging the light which is emitted from the integrated light receiving/emitting element 101 onto a signal surface of an optical disk 104, and an optics base 107 on which the integrated light receiving/emitting element 101 and the like are fixed.

The integrated light receiving/emitting element 101 is an element in which the followings are integrated: a light source 101d for emitting light with which the optical disk 104 is irradiated; a photodetector 101c for detecting light reflected from the signal surface of the optical disk 104 and converting it to electrical signals; and a hologram element 101a having a hologram region 101b for guiding the reflected light into the photodetector 101c.

This optical pickup includes an light-shielding mask 108 which has an aperture 108a in the center.

Light which is emitted from the light source 101d travels through the aperture 108a of the light-shielding mask 108, and thereafter is converged by the objective lens 103 onto a signal surface of the storage medium 104. The light which is reflected from the signal surface of the optical disk 104 again travels through the objective lens 103 and the aperture 108a of the light-shielding mask 108, and is diffracted by the hologram region 101b of the hologram element 101a, thus being converged onto the photodetector 101c. The photodetector 101c outputs a reproduction signal from the optical disk 104, as well as a focus error signal and a tracking error signal with which to control the position of the objective lens 103.

The light-shielding mask 108 functions to block any light other than a light beam 105 which is necessary for generating the various signals mentioned above so that the light does not enter the photodetector 101c. The reason is that, if reflected light from the optics base 107 and the objective lens 103 and unnecessary light other than the reproduced information from the optical disk 104 returned to the photodetector 101c, the noise component in the various signals would increase. In order to reduce the unnecessary light causing such noise as much as possible, the aperture 108a of the light-shielding mask 108 is designed so as to be as small as possible.

FIG. 8 is an essential structural diagram showing a conventional optical pickup which is described in Patent Document 2. The optical pickup of FIG. 8 includes an integrated light receiving/emitting element 201, and an objective lens 203 for converging light which is emitted from the integrated light receiving/emitting element 201 onto the signal surface of the optical disk 204.

The integrated light receiving/emitting element 201 is an element in which the followings are integrated: a light source 201d for emitting light with which the optical disk 204 is irradiated; a photodetector 201c for detecting light reflected from the signal surface of the optical disk 204 and converting it to electrical signals; and a hologram element 201a for guiding the reflected light into the photodetector 201c.

This optical pickup includes an light-shielding mask 209 which has an aperture 209a in the center.

The light-shielding mask 209 covers five faces of the hologram element 201a, and is capable of blocking almost all of the unnecessary light that may enter the photodetector 201c. The light-shielding mask 209 is directly attached to the hologram element 201a. Therefore, the positioning precision of the aperture 209a with respect to the hologram region of the hologram region 201 is high, and the aperture 209a can be made small without blocking any light which is necessary for irradiating the storage medium 204.

[Patent Document 1] Japanese Laid-Open Patent Publication No. 11-25496

[Patent Document 2] Japanese Laid-Open Patent Publication No. 2001-110085

DISCLOSURE OF INVENTION

Problems to be Solved by the Invention

In the optical pickup of FIG. 7, the light-shielding mask 108 is able to prevent unnecessary portions of the light reflected from the optics base 107 and the optical disk 104 from returning to the photodetector 101c. However, the aperture 108a of the light-shielding mask 108 is formed in a predetermined size for allowing, out of the light which is emitted from the light source 101d, only a partial light beam which is necessary for the recording/reproduction for the optical disk to pass therethrough. Therefore, a part of the light which is emitted from the light source 101d enters regions other than the aperture 108a of the light-shielding mask 108, and is reflected by the light-shielding mask 108. If such reflected light returns to the photodetector 101c, the purpose of providing the light-shielding mask 108 might be ruined. In order to prevent reflection at the rear face of the light-shielding mask 108, it is necessary to provide an antireflection coating on the rear face of the light-shielding mask 108, which would result in a disadvantage in that the production cost of the light-shielding mask 108 is increased.

On the other hand, in the optical pickup of FIG. 8, the interspace between the light-shielding mask 209 and the photodetector 201c is reduced because the light-shielding mask 209 is attached to the hologram element 201a. As a result, unnecessary light 210 which is reflected from the rear face of the light-shielding mask 209 and returns to the photodetector 201c may become relatively strong. Therefore, in the optical pickup of FIG. 8, it is also necessary to provide an expensive antireflection coating on the rear face of the light-shielding mask 209.

The present invention has been made in view of the above circumstances, and a main objective thereof is to provide: an optical pickup which can suppress the influence of stray light with an inexpensive construction; and an optical disk apparatus incorporating the optical pickup.

Means for Solving the Problems

An optical pickup according to the present invention is an optical pickup comprising: a light source for irradiating an optical disk with light; a lens for converging the light onto the optical disk; a photodetector having a plurality of detection regions for detecting light which is reflected from a signal surface of the optical disk and converting the light into an electrical signal; a hologram element having a hologram region for guiding the reflected light to the photodetector; and an optical shield for blocking at least a portion of light transmitted through a region of the hologram element other than the hologram region, wherein, the optical shield includes a light shielding portion for blocking light, and an aperture for allowing the light to be transmitted therethrough; and the aperture of the optical shield is present, above an upper face of the hologram element, in a region including the hologram region, and a center position of the aperture is shifted from a center position of the hologram region.

In a preferred embodiment, the light shielding portion of the optical shield traverses at least one of lines extending from a convergence point of the light to respective center portions of the plurality of detection regions.

In a preferred embodiment, the light shielding portion of the optical shield traverses at least one of lines extending from a convergence point of the light to respective center portions of the plurality of detection regions; and the aperture of the optical shield traverses at least one of the lines extending from a convergence point of the light to respective center portions of the plurality of detection regions.

In a preferred embodiment, the optical shield is in contact with or close to the upper face of the hologram element.

In a preferred embodiment, the light source and the photodetector are supported on a same substrate and compose a unit; and the hologram element is fixed on the unit.

In a preferred embodiment, the plurality of detection regions of the photodetector include tracking error signal detection regions and focus error signal detection regions; the hologram element includes a grating region formed on a lower face thereof, the grating region diffracting the light which is emitted from the light source to form two subbeams for a tracking error signal, and transmitting the light to form a main beam; and the hologram region causes the subbeams reflected from the optical disk to be guided to the tracking error signal detection regions, and causes the main beam reflected from the optical disk to be guided to the focus error signal detection regions.

In a preferred embodiment, the light shielding portion of the optical shield traverses lines extending from a convergence point of the light to center portions of the respective tracking error signal detection regions, and does not traverse at least one of lines extending from the convergence point of the light to center portions of the respective focus error signal detection regions.

In a preferred embodiment, the hologram element includes a rib for restricting movement of the optical shield.

In a preferred embodiment, the optical shield includes a pull knob.

In a preferred embodiment, the optical shield is formed of a resin or a metal.

In a preferred embodiment, the optical shield is of a sheet shape.

In a preferred embodiment, the optical shield is printed on the upper face of the hologram element.

In a preferred embodiment, the optical shield is composed of ink which is applied on the upper face of the hologram element.

An optical disk apparatus according to the present invention is an optical disk apparatus comprising a motor for rotating an optical disk and an optical pickup for optically reading information which is recorded on the optical disk, the optical pickup including: a light source for irradiating an optical disk with light; a lens for converging the light onto the optical disk; a photodetector having a plurality of detection regions for detecting light which is reflected from a signal surface of the optical disk and converting the light into an electrical signal; a hologram element having a hologram region for guiding the reflected light to the photodetector; and an optical shield for blocking at least a portion of light transmitted through a region of the hologram element other than the hologram region, wherein, the optical shield includes a light shielding portion for blocking light, and an aperture for allowing the light to be transmitted therethrough; and the aperture of the optical shield is present, above an upper face of the hologram element, in a region including the hologram region, and a center position of the aperture is shifted from a center position of the hologram region.

EFFECTS OF THE INVENTION

With an optical pickup according to the present invention, unnecessary light other than the light which is necessary for performing reproduction for an optical disk can be effectively prevented from returning to a photodetector, while suppressing returning of any unnecessary light ascribable to the reflection of the optical shield itself to the photodetector.

BRIEF DESCRIPTION OF DRAWINGS

[FIG. 4] (a) is a plan view showing location of a photodetector 1c according to an embodiment of the present invention; and (b) is a plan view showing location of an aperture 2a and a light shielding portion 2b of the light-shielding plate 2.

[FIG. 5] (a) is a plan view showing location of a photodetector which has a similar construction to that of the photodetector 1c according to an embodiment of the present invention; and (b) is a plan view showing location of an aperture 2a and a light shielding portion 2b of a conventional light-shielding mask.

[FIG. 6] (a) is a plan view showing location of the photodetector 1c; and (b) is a plan view showing location of the aperture 2a and the light shielding portion 2b of the light-shielding plate 2.

Figure 1:
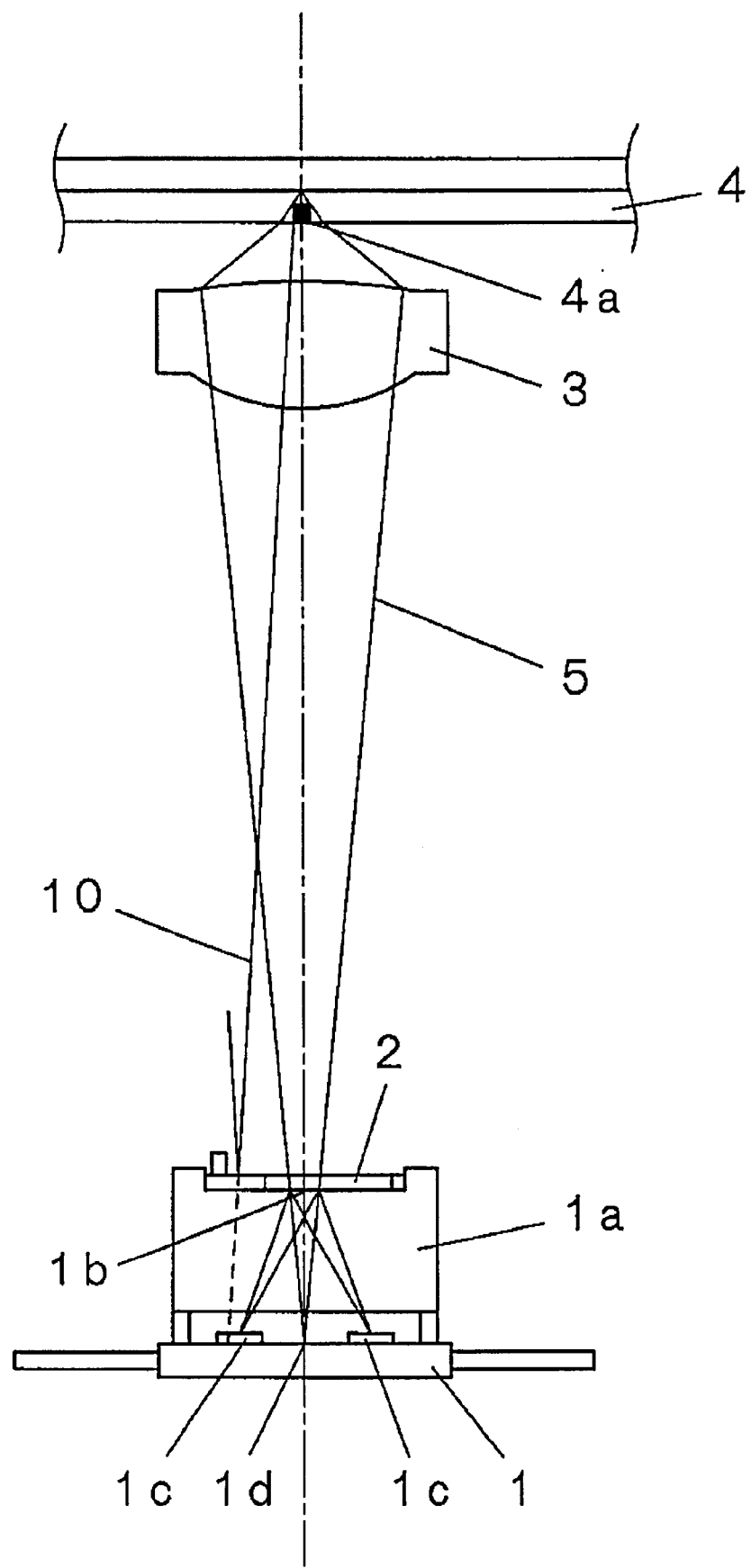
[FIG. 1] A schematic illustration showing the construction of an embodiment of an optical pickup according to the present invention.

DESCRIPTION OF THE REFERENCE NUMERALS 1 integrated light receiving/emitting element
1a hologram element
1b hologram region
1c photodetector
1cf focus error signal detection region
1ct tracking error signal detection region
1d light source
1e grating region
1f positioning rib
2 light-shielding plate
2a aperture
2b light shielding portion
2c pull knob
3 objective lens
4 optical disk
4a optical disk のsurface のscratch
5 ray

BEST MODE FOR CARRYING OUT THE INVENTION

An optical pickup according to the present invention includes: a light source; a lens for causing light which is emitted from the light source to be converged onto an optical disk; a hologram element having a hologram region for guiding light having been reflected from the optical disk into a photodetector; and an optical shield for blocking at least a portion of the light transmitted through a region of the hologram element other than the hologram region. The optical shield includes a light shielding portion for blocking light and an aperture which allows light to be transmitted therethrough. The aperture is present, above an upper face of the hologram element, in a region including the hologram region. The center position of the aperture is shifted from the center position of the hologram region.

Since the optical shield used for the optical pickup according to the present invention is constructed asymmetrically with respect to a line extending through the center of the hologram region, it is ensured that light shielding is enabled only with respect to a path of light which deteriorates the reproduction performance returning to the photodetector, rather than shielding almost all light other than the light which is necessary for reproduction from the optical disk. Moreover, the aperture of the optical shield can be made large, and unnecessary returned light which is ascribable to reflection from the optical shield can be reduced.

Hereinafter, with reference to the figures, an embodiment of an optical pickup according to the present invention will be described.

First, FIG. 1 is referred to. FIG. 1 is a diagram showing a cross-sectional structure of an optical pickup according to the present embodiment.

The optical pickup shown in FIG. 1 includes an integrated light receiving/emitting element 1 and an objective lens 3 for causing the light which is emitted from the integrated light receiving/emitting element 1 to be converged onto a signal surface of an optical disk 4. The optical disk 4 may for example be a CD (Compact Disc), but may also be any other optical disk. On the optical disk, a track is formed in concentric circles or spirals. In the case of a CD, emboss pits are arranged on the track, by means of which data is recorded. The optical disk 4 is rotated by a spindle motor (not shown) which is included in an optical disk apparatus such as a player. The objective lens 3 is supported by an actuator which is not shown.

The integrated light receiving/emitting element 1 is an element in which the followings are integrated: a light source 1d for emitting light with which the optical disk 4 is irradiated; a photodetector 1c for detecting light having been reflected from the signal surface of the optical disk 4 and converting the light into electrical signals; and a hologram element 1a having a hologram region 1b for guiding the reflected light into the photodetector 1c. A light-shielding plate 2 which functions as an "optical shield" is attached to the hologram element 1a of the integrated light receiving/emitting element 1.

Figure 2:
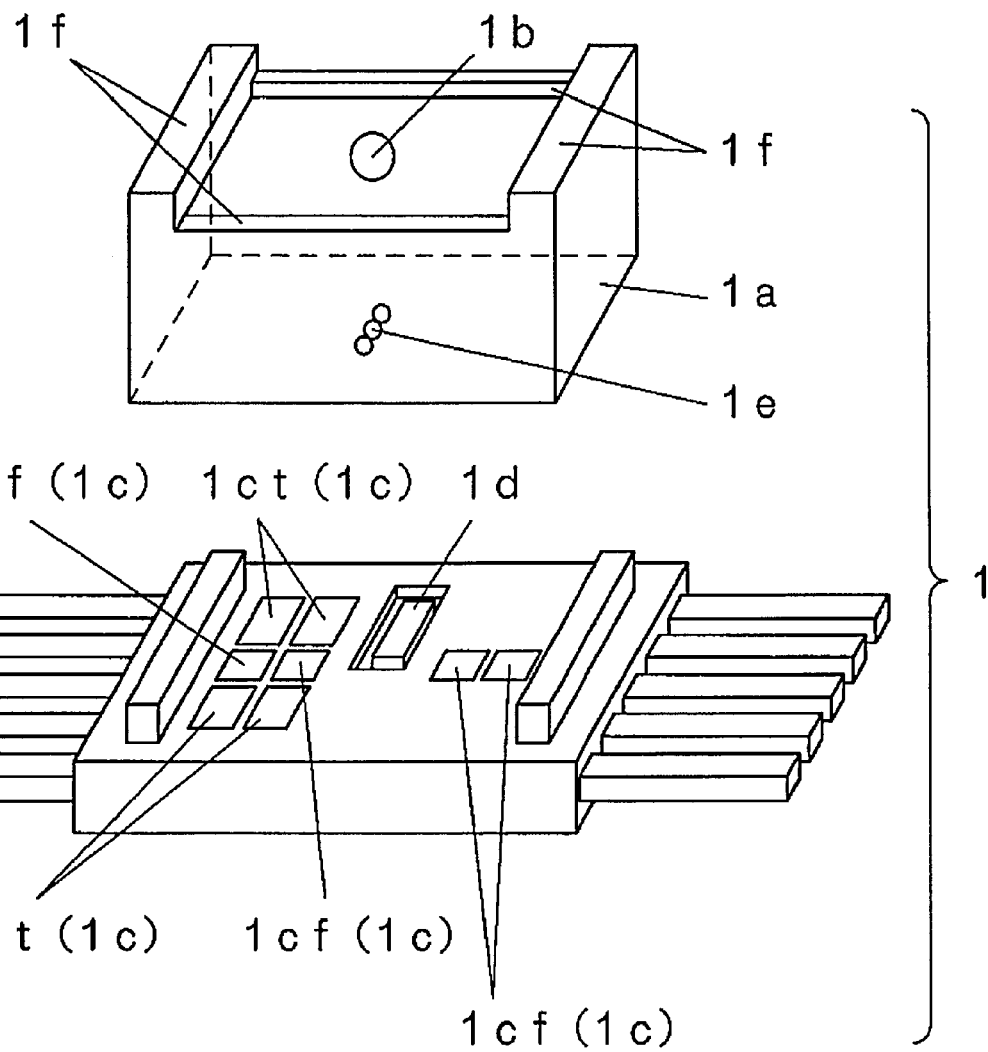
[FIG. 2] An exploded perspective view of a light-shielding plate 2 and an integrated light receiving/emitting element 1 used in the optical pickup of FIG. 1.
Figure 3:
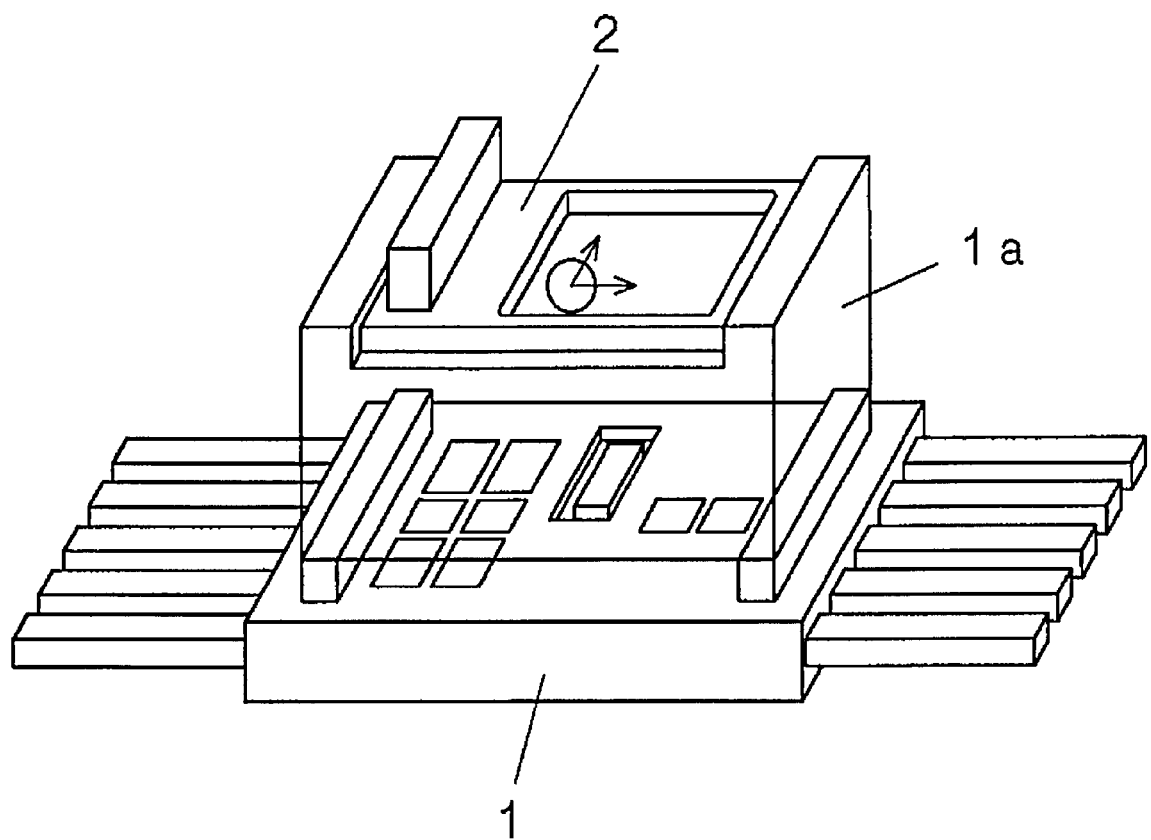
[FIG. 3] A perspective view showing the light-shielding plate 2 used in the optical pickup of FIG. 1 having been attached to the integrated light receiving/emitting element 1.
Figure 7:
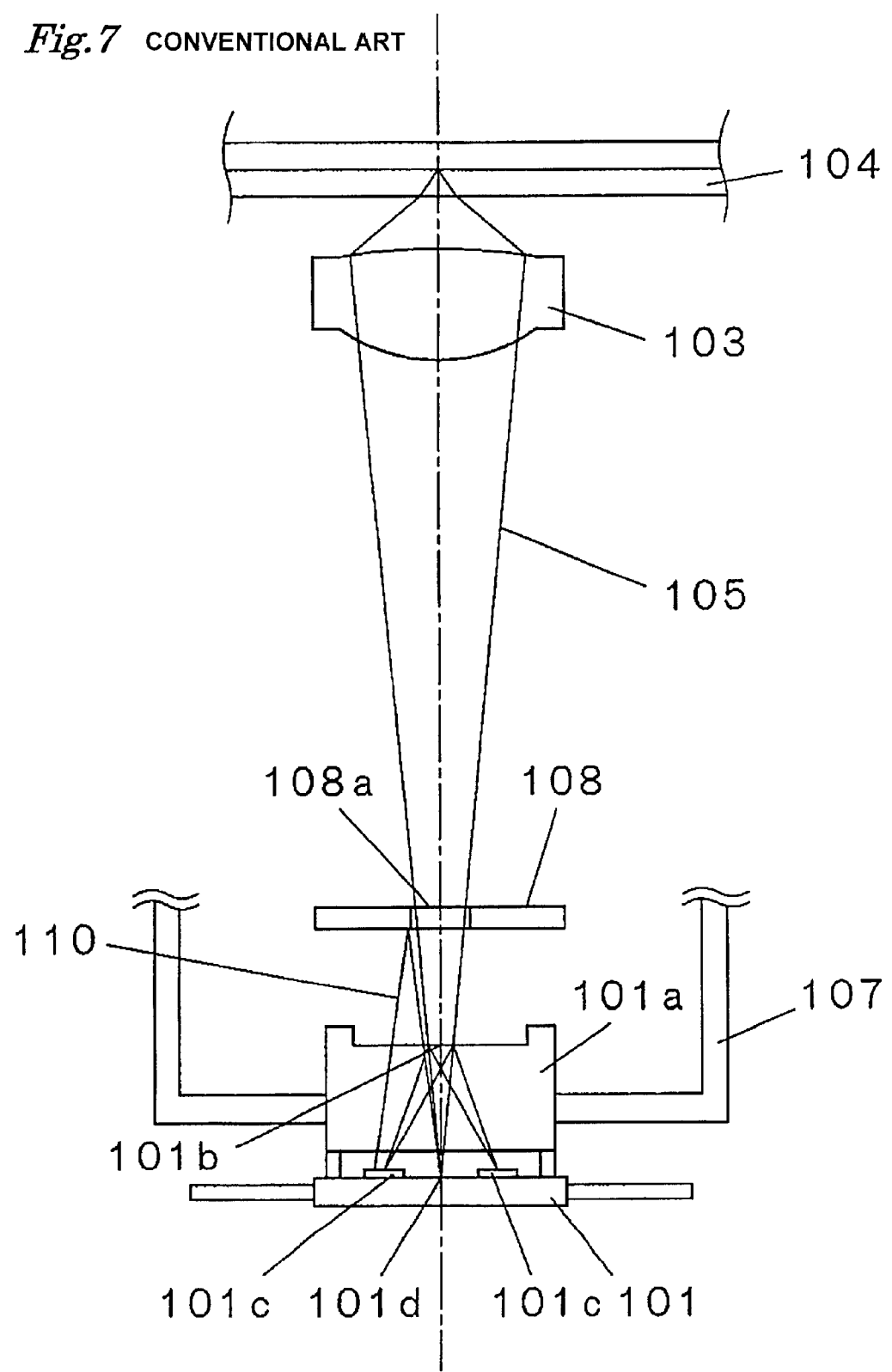
[FIG. 7] A schematic illustration showing the construction of a conventional example of an optical pickup.
Figure 8:
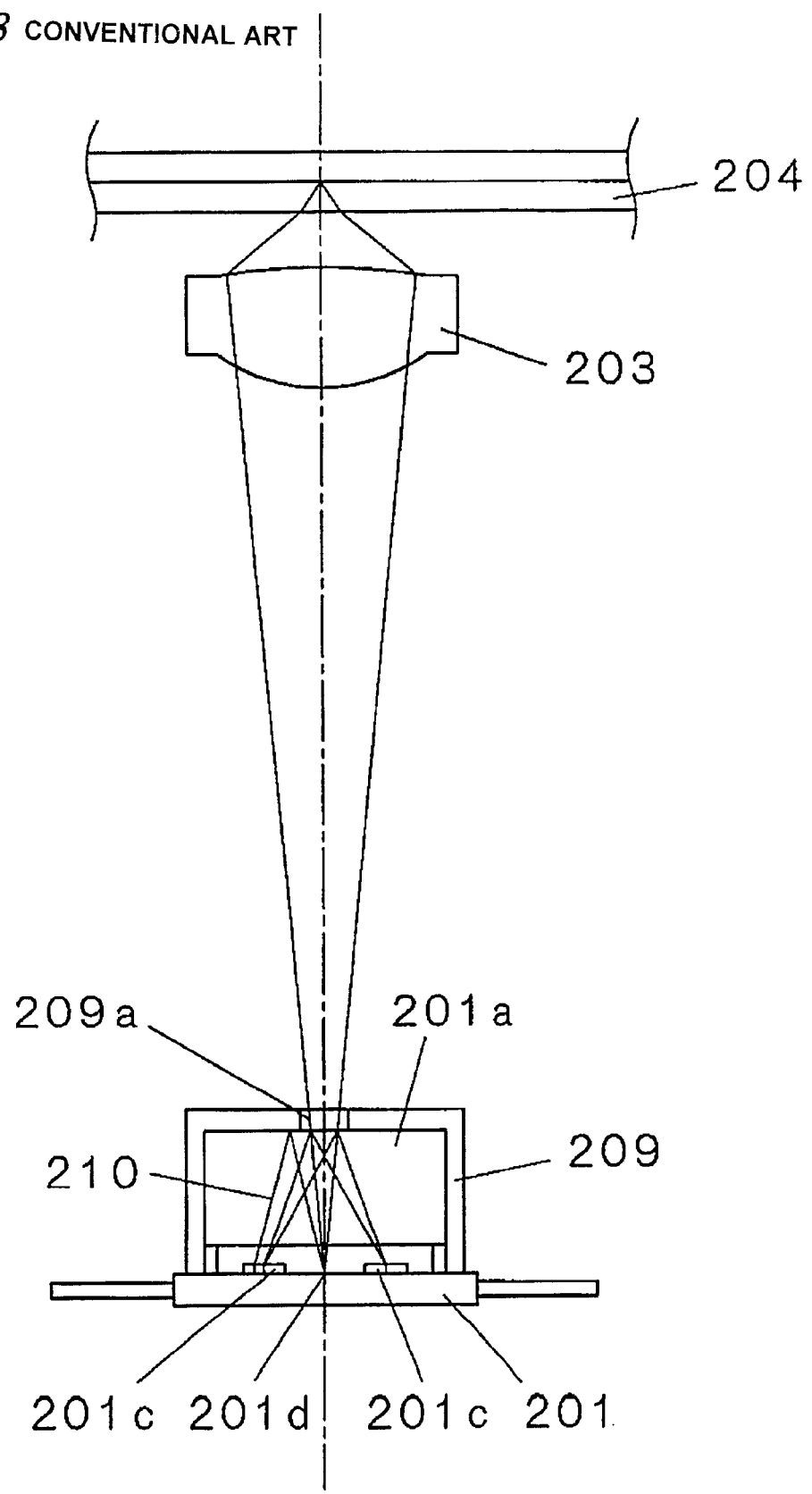
[FIG. 8] A schematic illustration showing the construction of another conventional example of an optical pickup.

Hereinafter, referring to FIG. 2 and FIG. 3, the construction of the light-shielding plate 2 and the integrated light receiving/emitting element 1 will be described in detail. FIG. 2 is an exploded perspective view showing the light-shielding plate 2 and the integrated light receiving/emitting element 1. FIG. 3 is a perspective view showing the structure after the light-shielding plate 2 is mounted in the integrated light receiving/emitting element 1.

The light-shielding plate 2 to be used in the present embodiment is formed of a material having light-shielding ability, and includes an aperture 2a and a light shielding portion 2b. The light-shielding plate 2 may suitably be formed of a resin such as ABS (acrylonitrile-butadiene-styrene copolymer), for example, but may also be formed of any other material which exhibits light-shielding ability, e.g., a metal.

The size and outer shape of the light-shielding plate 2 may be designed in accordance with the size and shape of the hologram element 1a. The light-shielding plate 2 is formed from a sheet having a thickness of 100 to 500 μm, for example, and its planar size may have a generally rectangular size such that one side is about 2.5 mm to 3.0 mm long.

The most characteristic aspect of the light-shielding plate 2 of the present embodiment is the location of the aperture 2a. After light which is emitted from the light source 1d enters the hologram element 1a, the light passes through the aperture 2a and heads toward the objective lens 3. Therefore, the aperture 2a needs to be located so as not to block any light beam which is necessary for reproduction from the optical disk apparatus 1. Hereinafter, referring to FIGS. 4(a) and (b), the relationship between location of the photodetector 1c and location of the aperture 2a and the light shielding portion 2b of the light-shielding plate 2 will be described.

FIG. 4(a) is a plan view showing location of the photodetector 1c, and FIG. 4(b) is a plan view showing location of the aperture 2a and the light shielding portion 2b of the light-shielding plate 2.

As shown in FIG. 4(a), the photodetector 1c includes a plurality of detection regions 1cf and 1ct. Location of the detection regions 1cf and 1ct may vary, without being limited to the exemplary location shown in FIG. 4(a), but it is generally likely that the detection regions 1cf and 1ct are asymmetrically located on a light-receiving surface of the photodetector 1c. Preferably, the detection regions 1cf and 1ct are photodiodes which are formed on a silicon substrate that supports a semiconductor laser functioning as the light source 1d. In the example shown in FIG. 4(a), the detection regions 1cf and 1ct are asymmetrically located with respect to a broken line A-A which extends through a central portion (where the light source 1d is) of the optical pickup. The broken line A-A is parallel to a tangential direction of the track on the optical disk 4. For comparison, FIG. 5(b) shows a plane layout of a conventional optical shield (light-shielding mask) 52. FIG. 5(a) shows detection regions 51cf and 51ct of a photodetector 51c having a construction similar to the construction of the photodetector 2c. Although location of the detection regions 51cf and 51ct is asymmetric with respect to a broken line A-A as shown in FIG. 5(a), the conventional light-shielding mask 52 shown in FIG. 5(b) is designed so that the aperture 52a is symmetric with respect to the broken line A-A and that the center position of the aperture 2a coincides with the center position of the hologram region 1b.

According to a study of the inventors, the degree of the influence exerted by unnecessary light which is reflected from the optical disk 4 entering each of the detection regions 1cf and 1ct varies depending on the detection region 1cf or 1ct. As compared to the detection regions 1cf (which are for generating a focus error signal), the detection regions 1ct (which are for generating a tracking error signal) are more susceptible to the influences of the aforementioned unnecessary light coming in. On the other hand, even if the aforementioned unnecessary light enters the detection regions 1cf (which are for generating a focus error signal), a relatively small noise component occurs in the generated focus error signal, and focus control is not likely to be disturbed.

Further according to a study of the inventors, in the case where the light-shielding plate 2 is attached to an integrated light receiving/emitting element 1 in which the detection regions 1cf and 1ct are located as shown in FIG. 4(a), forming the aperture 2a in a position as shown in FIG. 4(b) actually serves to reduce stray light within the hologram. This is because the aperture 2a provided as shown in FIG. 4(b) restrains the light exiting the light source 1d from being reflected by the rear face of the light shielding portion 2b so as to enter the detection regions 1ct. In other words, it is preferable that the light shielding portion 2a is not formed to the right of the broken line A-A in FIG. 4(b).

In the case where the detection regions 1cf and 1ct are asymmetrically located, correspondingly forming the aperture 2a and the light shielding portion 2b in an asymmetric manner makes it possible to effectively block unnecessary light from the optical disk 4 while also suppressing unnecessary light ascribable to reflection at the light-shielding plate 2.

Thus, in the optical pickup of the present embodiment, the aperture 2a of the light-shielding plate 2 is formed large so as to correspond to the location of the detection regions 1cf and 1ct of the photodetector 1c, and the center position of the aperture 2a is shifted from the center position of the hologram region 1b by 0.3 mm.

Note that it is not necessary for the detection regions 1cf to be located directly under the aperture 2a of the light-shielding plate 2. From design reasons, as shown in FIGS. 6(a) and (b), all detection regions 1cf and 1ct may be located only at the side where the light shielding portion 2b of the light-shielding plate 2 is provided.

Next, referring back to FIG. 2, the construction of the light-shielding plate 2 and the integrated light receiving/emitting element 1 will be described.

On an upper face of the hologram element 1a of the integrated light receiving/emitting element 1 shown in FIG. 2, positioning ribs 1f (height: about 0.2 to 0.5 mm; width: about 0.5 mm) are provided on the four ends. In a central portion of the region surrounded by the positioning ribs 1f on the upper face of the hologram element 1a, the hologram region 1b is provided. The hologram region 1b serves to diffract light which is reflected from the optical disk 4 and form light beams which enter the respective detection regions 1cf and 1ct. The diameter of the hologram region 1b (effective diameter) is determined by the size (effective diameter) of the light beam which is necessary for data reproduction. In the present embodiment, the hologram region 1b has a diameter of about 0.2 to 0.8 mm. Note that the size of the hologram surface to be actually formed may be larger than the effective diameter of the hologram region 1b.

On a lower face of the hologram element 1a is formed a grating region 1e for diffracting laser light entering from the light source and forming two subbeams besides the main beam.

The light-shielding plate 2 is inserted within the space surrounded by the positioning ribs 1f, and is located so that the lower face of the light-shielding plate 2 is close to or in contact with the hologram region 1b. When attaching the light-shielding plate 2 to the hologram element 1a, the light-shielding plate 2 may be inserted in such a manner that the outer edge of the light-shielding plate 2 fits along the inner wall faces of the positioning ribs 1f, whereby the light-shielding plate 2 can be located with respect to the hologram element 1a with a high positioning precision. At a portion of the light-shielding plate 2, a pull knob 2c is provided to be used in conjunction with a chuck upon insertion. By grabbing on the pull knob 2c, it becomes possible to easily attach the light-shielding plate 2 to the hologram element 1a, thus improving workability. Instead of providing the pull knob 2c, any structure (e.g., a hole) that is suitable for a chuck may be provided in a portion of the light-shielding plate 2.

FIG. 3 shows the light-shielding plate 2 having been attached to the hologram element 1a. The light-shielding plate 2 is secured to the hologram element 1a with, for example, an adhesive which cures upon UV irradiation.

Next, referring to FIG. 1 and FIG. 2, an operation of the optical pickup of the present embodiment will be described.

When light (infrared laser light) that is emitted from the light source 1d, which is typically an infrared semiconductor laser, enters the grating region 1e shown in FIG. 2, a portion thereof is transmitted therethrough, but another portion thereof is diffracted. As a result, in addition to the light ($0^{th}$ order light) which is transmitted through the grating region 1e, $+1^{st}$ order light and $-1^{st}$ order light are formed via diffraction. Among these three light beams, the $0^{th}$ order light beam functions as a main beam, whereas the $\pm 1^{st}$ order light functions as two subbeams. In the optical pickup of the present embodiment, tracking control by a three beam technique is performed, where the two subbeam are used for generating a tracking error signal. Note that, although diffracted light of higher orders is also generated in the grating region 1e, such light falls outside the effective light beam and therefore is negligible.

FIG. 2 schematically shows three beam spots at the grating region 1e. The three beams are transmitted through the hologram element 1a, and form the light beam 5 in FIG. 1. The light beam 5 is converged by the objective lens 3 onto the optical disk 4. In the present embodiment, the aperture 2a of the light-shielding plate 2 is sufficiently larger than the cross section of the light beam 5.

The light beam (main beam) which is transmitted through the grating region 1e is used for generating a focus error signal and a reproduction signal from the optical disk 4. On the other hand, the two light beams (subbeams) which have been diffracted in the grating region 1e are used for generating a tracking error signal.

The light which is reflected from the signal surface of the optical disk 4 is transmitted through the objective lens 3 shown in FIG. 1, and then, after passing through the aperture 2a of the light-shielding plate 2, enters the hologram region 1b of the hologram element 1a. The reflected light is diffracted by the hologram region 1b so as to be split into a plurality of light beams. The split light beams enter the plurality of detection regions of the photodetector 1c. Some of the split light beams focus error signal detection regions 1cf, while others enter the tracking error signal detection regions 1ct.

Next, unnecessary light which occurs in the case where a scratch 4a exists on the surface of the optical disk 4 will be described.

As shown in FIG. 1, when a convergence point of the light beam 5 created by the objective lens 3 crosses the scratch 4a on the optical disk 4, a portion of the light beam 5 is diffracted or scattered by the scratch 4a on the optical disk 4. A portion of the diffracted or scattered light returns to the photodetector 1c of the integrated light receiving/emitting element 1, as unnecessary light 10.

If it were not for the light-shielding plate 2 of the present embodiment, most of the unnecessary light 10 returning to the photodetector 1c would pass through a surrounding region, i.e., other than where the hologram region 1b is formed, of the upper face of the hologram element 1a. If such light 10 entered the photodetector 1c, a noise component would be superposed on the electrical signals which are output from the photodetector 1c.

If such unnecessary light 10 entered the tracking error signal detection regions 1ct, a large influence would be exerted upon reproduction from the optical disk 4. Therefore, the light shielding portion 2b is formed so as to securely cover portions defined by projecting the tracking error signal detection regions 1ct against the upper face of the hologram element 1a along the direction of travel of light. In other words, the light shielding portion 2b is formed so as to block any lines which interconnect the convergence point of the light beam 5 and the tracking error signal detection regions 1ct.

Note that the two subbeams ($\pm 1^{st}$ order diffracted light) which are used for generating a tracking error signal are formed by the light emitted from the light source 1d entering and being diffracted by the grating region 1e shown in FIG. 2. Since the diffraction angle is likely to vary at the grating region 1e, it is difficult to ensure that the subbeams reflected from the optical disk 4 are accurately guided to the light detection regions 1cf. On the other hand, the main beam ($0^{th}$ order light) used for generating a focus error signal is transmitted through the grating region 1e without being diffracted, and therefore it is relatively easy to guide the main beam reflected from the optical disk 4 to the focus error signal detection regions 1cf. Especially in an integrated-type laser unit, assembly/adjustment is usually performed so as to optimize the location of the focus error signal detection regions 1cf. Therefore, the tracking error signal detection regions 1ct are formed so as to be larger than the focus error signal detection regions 1cf, and thus are likely to have more unnecessary light (i.e., other than the light which is necessary for reproduction) return thereto.

Moreover, the light amount of each subbeam which is used for generating a tracking error signal is prescribed to be smaller than the light amount of the main beam which is used for signal reproduction. Therefore, the output from each detection region 1ct used for a tracking error signal relatively lowers, thus receiving a greater influence of unnecessary light.

In the present embodiment, the light shielding portion 2b of the light-shielding plate 2 traverses the lines which extend from the tracking error signal detection regions 1ct to the convergence point of the light beam, whereas the light shielding portion 2b of the light-shielding plate 2 does not traverse the lines which extend from at least some of the focus error signal detection regions 1cf to the convergence point of the light beam. Therefore, without providing an antireflection coating on the light-shielding plate 2, unnecessary light other than the reproduction signal from the optical disk 4 can be restrained from returning to the photodetector 1c.

Although the above embodiment adopts a construction in which one light source is located within one optical pickup, the present invention is not limited to an optical pickup having such a construction. The present invention is also applicable to an optical pickup which includes a plurality of light sources for emitting light beams of different wavelengths. Moreover, the method for generating a tracking error signal and a focus error signal is not limited to a three beam technique, and the present invention is also applicable to the case of using a differential push-pull technique.

Although the above embodiment employs a light-shielding plate as an optical shield, an optical shield which is printed on the upper face of the hologram element 1a, or an optical shield composed of applied ink may be employed instead of a light-shielding plate. The aperture of the optical shield may have a partially-open envelope, while having a shape and size corresponding to "a portion of the upper face of the hologram element that is not covered by a light shielding portion". In the case where the aperture is not enclosed by a closed curve, the "center of the aperture" can be identified as a center (areal center of gravity) of "a portion of the upper face of the hologram element that is not covered by a light shielding portion". Furthermore, there may be a plurality of apertures in the optical shield. The center of any aperture other than the aperture for keeping the hologram region open is shifted from the center of the hologram region, and the entirety of the apertures are asymmetrically located.

INDUSTRIAL APPLICABILITY

An optical pickup according to the present invention is suitably used for an optical disk apparatus which reproduces data from an optical disk.

The invention claimed is:

1. An optical pickup comprising:
    a light source for irradiating an optical disk with light;
    a lens for converging the light onto the optical disk;
    a photodetector having a plurality of detection regions for detecting light which is reflected from a signal surface of the optical disk and converting the light into an electrical signal;
    a hologram element having a hologram region for guiding the reflected light to the photodetector; and
    an optical shield for blocking at least a portion of light transmitted through a region of the hologram element other than the hologram region, wherein,
    the optical shield includes a light shielding portion for blocking the reflected light, and an aperture for allowing the reflected light to be transmitted therethrough; and
    the aperture of the optical shield is present, above an upper face of the hologram element, in a region including the hologram region, and a center position of the aperture is shifted from a center position of the hologram region; and
    the plurality of detection regions of the photodetector include tracking error signal detection regions and focus error signal detection regions; and
    the light shielding portion of the optical shield traverses lines extending from a convergence point of the light on the optical disk to center portions of the respective tracking error signal detection regions, and does not traverse at least one of lines extending from the convergence point of the light on the optical disk to center portions of the respective focus error signal detection regions.

2. The optical pickup of claim 1, wherein the optical shield is in contact with or close to the upper face of the hologram element.

3. The optical pickup of claim 1, wherein,
    the light source and the photodetector are supported on a same substrate and compose a unit; and
    the hologram element is fixed on the unit.

4. The optical pickup of claim 1, wherein,
    the hologram element includes a grating region formed on a lower face thereof, the grating region diffracting the light which is emitted from the light source to form two subbeams for a tracking error signal, and transmitting the light to form a main beam; and
    the hologram region causes the subbeams reflected from the optical disk to be guided to the tracking error signal detection regions, and causes the main beam reflected from the optical disk to be guided to the focus error signal detection regions.

5. The optical pickup of claim 1, wherein the hologram element includes a rib for restricting movement of the optical shield.

6. The optical pickup of claim 1, wherein the optical shield includes a pull knob.

7. The optical pickup of claim 1, wherein the optical shield is formed of a resin or a metal.

8. The optical pickup of claim 1, wherein the optical shield is of a sheet shape.

9. The optical pickup of claim 1, wherein the optical shield is printed on the upper face of the hologram element.

10. The optical pickup of claim 1, wherein the optical shield is composed of ink which is applied on the upper face of the hologram element.

11. An optical disk apparatus comprising a motor for rotating an optical disk and an optical pickup for optically reading information which is recorded on the optical disk,
    the optical pickup including:
    a light source for irradiating an optical disk with light;
    a lens for converging the light onto the optical disk;
    a photodetector having a plurality of detection regions for detecting light which is reflected from a signal surface of the optical disk and converting the light into an electrical signal;
    a hologram element having a hologram region for guiding the reflected light to the photodetector; and
    an optical shield for blocking at least a portion of light transmitted through a region of the hologram element other than the hologram region, wherein,
    the optical shield includes a light shielding portion for blocking the reflected light, and an aperture for allowing the reflected light to be transmitted therethrough; and
    the aperture of the optical shield is present, above an upper face of the hologram element, in a region including the hologram region, and a center position of the aperture is shifted from a center position of the hologram region; and
    the plurality of detection regions of the photodetector include tracking error signal detection regions and focus error signal detection regions; and
    the light shielding portion of the optical shield traverses lines extending from a convergence point of the light on the optical disk to center portions of the respective tracking error signal detection regions, and does not traverse at least one of lines extending from the convergence point of the light on the optical disk to center portions of the respective focus error signal detection regions.

* * * * *